US012214974B2

(12) United States Patent
Fike et al.

(10) Patent No.: US 12,214,974 B2
(45) Date of Patent: Feb. 4, 2025

(54) RIGHT ANGLE TRANSFER DEVICE

(71) Applicant: Dematic Corp., Grand Rapids, MI (US)

(72) Inventors: Rustin Fike, Rockford, MI (US); Veronique Cole, Greenville, MI (US); Harry Thad German, Belding, MI (US); Laszlo T. Szebelledy, Rockford, MI (US); William R. Stickland, Grandville, MI (US); Dean Leek, Caledonia, MI (US)

(73) Assignee: Dematic Corp., Grand Rapids, MI (US)

( * ) Notice: Subject to any disclaimer, the term of this patent is extended or adjusted under 35 U.S.C. 154(b) by 186 days.

(21) Appl. No.: 18/101,647

(22) Filed: Jan. 26, 2023

(65) Prior Publication Data

US 2023/0234788 A1    Jul. 27, 2023

Related U.S. Application Data

(60) Provisional application No. 63/303,056, filed on Jan. 26, 2022.

(51) Int. Cl.
*B65G 47/64* (2006.01)
*B65G 13/07* (2006.01)
(Continued)

(52) U.S. Cl.
CPC ............ *B65G 47/643* (2013.01); *B65G 43/00* (2013.01); *B65G 47/54* (2013.01); *B65G 13/07* (2013.01);
(Continued)

(58) Field of Classification Search
CPC ...... B65G 47/643; B65G 43/00; B65G 47/54; B65G 13/07; B65G 39/12; B65G 2203/043; B65G 2203/044
See application file for complete search history.

(56) References Cited

U.S. PATENT DOCUMENTS

| 2,156,248 A | * | 4/1939 | Wegner | .................. B65G 47/54 198/463.3 |
| 6,505,733 B2 | | 1/2003 | Troupos et al. | |

(Continued)

FOREIGN PATENT DOCUMENTS

WO    20000075055 A1    12/2000

OTHER PUBLICATIONS

International Search Report and Written Opinion from corresponding Patent Cooperation Treaty (PCT) Application No. PCT/IB2023/050688, completed Apr. 7, 2023.

*Primary Examiner* — Gene O Crawford
*Assistant Examiner* — Lester Rushin, III
(74) *Attorney, Agent, or Firm* — Gardner, Linn, Burkhart & Ondersma LLP

(57) ABSTRACT

A right angle transfer device has a conveying surface defined by a plurality of conveying members that are driven to convey objects in a conveyance direction. A diverting conveying member is mounted to a frame and is driven to divert objects in a direction angled away from the conveyance direction. A lift drive rotates a cam to move a bar in a substantially horizontal direction. The movement of the bar causes a frame link connected to the bar and the frame to raise and lower the frame. Once the frame has been moved upward to a sufficient extent, the diverting conveying member will be raised above the conveying members to come into contact with the object to thereby move and divert the object away from the conveyance direction.

20 Claims, 14 Drawing Sheets

(51) Int. Cl.
 *B65G 39/12* (2006.01)
 *B65G 43/00* (2006.01)
 *B65G 47/54* (2006.01)

(52) U.S. Cl.
 CPC ........ *B65G 39/12* (2013.01); *B65G 2203/043* (2013.01); *B65G 2203/044* (2013.01)

(56) References Cited

U.S. PATENT DOCUMENTS

| | | |
|---|---|---|
| 7,383,935 B2 * | 6/2008 | Tasma .................. B65G 13/071 198/782 |
| 9,290,333 B2 | 3/2016 | Skanse et al. |
| 9,365,361 B1 * | 6/2016 | Skarlupka .............. B65G 47/54 |
| 9,469,486 B2 | 10/2016 | German |
| 9,617,083 B2 | 4/2017 | Itoh et al. |
| 10,053,300 B2 | 8/2018 | Itoh et al. |
| 2002/0063021 A1 | 5/2002 | Schiesser |
| 2016/0229644 A1 | 8/2016 | Itoh et al. |
| 2018/0229937 A1 | 8/2018 | Itoh et al. |
| 2020/0189852 A1 | 6/2020 | Karol et al. |

* cited by examiner

RIGHT ANGLE TRANSFER DEVICE

CROSS REFERENCE TO RELATED APPLICATION

The present application claims priority of U.S. provisional application Ser. No. 63/303,056, filed Jan. 26, 2022, which is hereby incorporated herein by reference in its entirety.

FIELD OF THE INVENTION

The present invention relates to a transfer device constituting a part of a conveyer line, and more particularly to a transfer device adapted to transfer an object from a conveyance direction to a diverted direction.

BACKGROUND OF THE INVENTION

An object may be physically moved or transferred on an assembly line or otherwise by a first conveyor line in a conveyance direction. Often times, the object needs to be moved in a direction alternate to the conveyance direction in order to arrive at a desired location. The direction of the object may be changed by raising a second conveyor line, moving in an alternate direction relative to the conveyance direction, above the first conveyor line. The force used to raise and lower the second conveyor line is commonly provided through pneumatic force.

SUMMARY OF THE INVENTION

The right angle transfer device according to an aspect of the present invention is adapted to change the direction of an object being moved on a conveyance surface in a conveyance direction. The direction of an object moving in the conveyance direction is changed by raising a diverting surface above the conveyance surface. The right angle transfer reduces the amount of vertical space and vertical movement required to raise the diverting surface above the conveyance surface. A motorized drive roller is activated to rotate a cam. The cam, which may optionally be a helical cam, rotates to push a bar horizontally. A pair of links cooperatively rotate with one another and with the bar as the bar moves horizontally. One of the links is connected to a frame such that as the link rotates the frame is raised upward. The diverting surface is affixed to the frame such that the diverting surface is raised as the frame is raised. Once the diverting surface is raised into contact with the object, it is lifted above a first conveyor line and the object is diverted away from the conveyance direction.

According to an embodiment, a right angle transfer includes a base, multiple conveying members that define a conveyance surface, in which the conveying members are drivable to convey an object in a conveyance direction, and a diverting conveying member that is drivable to divert the object at an angle from the conveyance direction. A frame mounts the diverting conveying member for general vertical movement with respect to the conveying members and the base. The right angle transfer also includes a lifting assembly having a cam that is coupled to a lift drive, a bar that is coupled to the cam and drivable, for example, via a cam follower, and a frame link that is coupled to the bar and to the frame. The lift drive rotates the cam to urge the bar horizontally, thereby causing the frame link to vertically raise and lower the frame with respect to the conveying members.

In one aspect, the cam comprises a first cam coupled to the lift drive laterally adjacent a first side of the frame. Additionally, the lifting assembly further includes a second cam coupled to the lift drive laterally adjacent a second side of the frame opposite the first side of the frame. A second bar is coupled to the second cam, and a second frame link is coupled to the second bar and the frame. The lift drive can rotate the second cam to horizontally urge the second bar, thereby causing the second frame link to vertically raise and lower the frame with respect to the conveying members.

In another aspect, the lift drive is an electrically-powered motorized roller having a motor mechanism internal to a roller shell.

In yet another aspect, the lift drive rotates the cam in a lifting direction to urge the bar in a first horizontal direction, thereby raising the frame relative to the conveyance surface. The lift drive also rotates a lowering direction, for example, due to the force of gravity acting on at least the frame, in which the bar moves in a second horizontal direction opposite the first horizontal direction, thereby lowering the frame relative to the conveyance surface.

In still another aspect, the cam has an outer cam profile, and a central rotation point about which the cam rotates. The outer cam profile includes a helical section in which the radial distance between the central rotation point and the helical section changes at a constant rate along the length of the helical section. The cam profile may further include a startup section in which the radial distance between the central rotation point and the startup section remains constant along the length of the startup section, and in which the startup section determines the horizontal displacement of the bar when the cam begins to rotate in the lifting direction. Optionally, the cam profile further includes a holding section, in which the radial distance between the central rotation point and the holding section remains constant along the length of the holding section, and in which the holding section determines the horizontal displacement of the bar when the cam begins to rotate in the lowering direction.

In a further aspect, an electrically-powered diverting drive can drive the diverting conveying member. The diverting drive may be energized while the diverting conveying member is being raised vertically upward. Optionally, a pair of spaced-apart stabilizing supports coupled to the frame and to the base to support the frame.

In yet a further aspect, a resilient member is coupled between the frame and base, and counteracts the majority of the weight of the frame.

In still a further aspect, a base link is coupled to the bar and to the bracket, and is oriented relative to the bar at a base link angle. The frame link is oriented relative to the bar at a frame link angle. As the bar is urged horizontally, the frame link and base link angles change such that the frame link angle increases when the base link angle decreases, and the frame link angle decreases when the base link angle increases. Optionally, a second frame link is coupled to the bar and to the frame, and a second base link is coupled to the bar and to the bracket. The second frame link is oriented parallel to the first frame link, and the second base link is oriented parallel to the first base link.

In another aspect, a lift drive control can control the rotation of the lift drive. Optionally a flag sensor is in electrical communication with a controller, and the controller is in electrical communication with the lift drive. A flag is coupled to the lift drive and rotates synchronously with the lift drive. The flag sensor detects the flag once the flag has rotated to a stopping position, in which the controller then recognizes a stop signal caused by the flag sensor. Upon recognizing the stop signal, the controller directs the lift drive to stop rotating in the lifting direction.

According to another embodiment, a right angle transfer includes a base, multiple conveying members that define a conveyance surface, the conveying members drivable to convey objects in a conveyance direction, and a diverting conveying member that is drivable to divert objects at an angle from the conveyance direction. A frame mounts the diverting conveying member for general vertical movement with respect to the conveying members and the base. Multiple resilient members are coupled between the frame and the base, and bias the frame upward. A lifting assembly includes a bar coupled to the lift drive and the frame, and a cam that is coupled to a lift drive. The lift drive can rotate in a lifting direction to rotate the cam to move the bar. The motion of the bar vertically raises and lowers the frame to raise the diverting conveying member above the conveying members and to lower the diverting conveying member below the conveying members. The lift drive is de-energized while it rotates in a lowering direction opposite the lifting direction.

In one aspect, the cam has an outer cam profile, and a central rotation point about which the cam rotates. The outer cam profile includes a helical section in which the radial distance between the central rotation point and the helical section changes at a constant rate along the length of the cam. The outer cam profile also includes a pair of flat sections located on opposing sides of the helical section, in which the radial distance between each the flat section and the central rotation point remains constant along the length of each flat section.

In another aspect, multiple diverting conveying members are drivable to divert objects at an angle from the conveyance direction, in which the diverting conveying members are vertically displaceable above and below the conveying members.

According to a further embodiment, a right angle transfer includes a base, multiple conveying members that define a conveyance surface, the conveying members drivable to convey an object in a conveyance direction, and a diverting conveying member that is drivable to divert the object at an angle from the conveyance direction. A frame is coupled to the base and to the diverting conveying member. A lifting assembly includes a nautilus-shaped cam mounted circumferentially around an electrically-powered lift drive, a bar coupled to a cam follower that is coupled to the cam, and a frame link that is coupled to the bar and to the frame. The lift drive is rotatable about its longitudinal axis to rotate the cam to urge the cam follower and the bar horizontally. The frame link rotates between the bar and the frame to convert horizontal motion of the bar into vertical motion of the frame and the diverting conveying member. The diverting conveying member may be vertically raised above the conveying members to make contact with the object and divert the object at an angle from the conveyance direction.

In one aspect, a diverting drive can drive the diverting conveying member, in which the diverting drive is coupled to the frame and is vertically raised and lowered with the frame These and other objects, advantages, purposes and features of the present invention will become apparent upon review of the following specification in conjunction with the drawings.

DETAILED DESCRIPTION OF THE PREFERRED EMBODIMENTS

Figure 1:
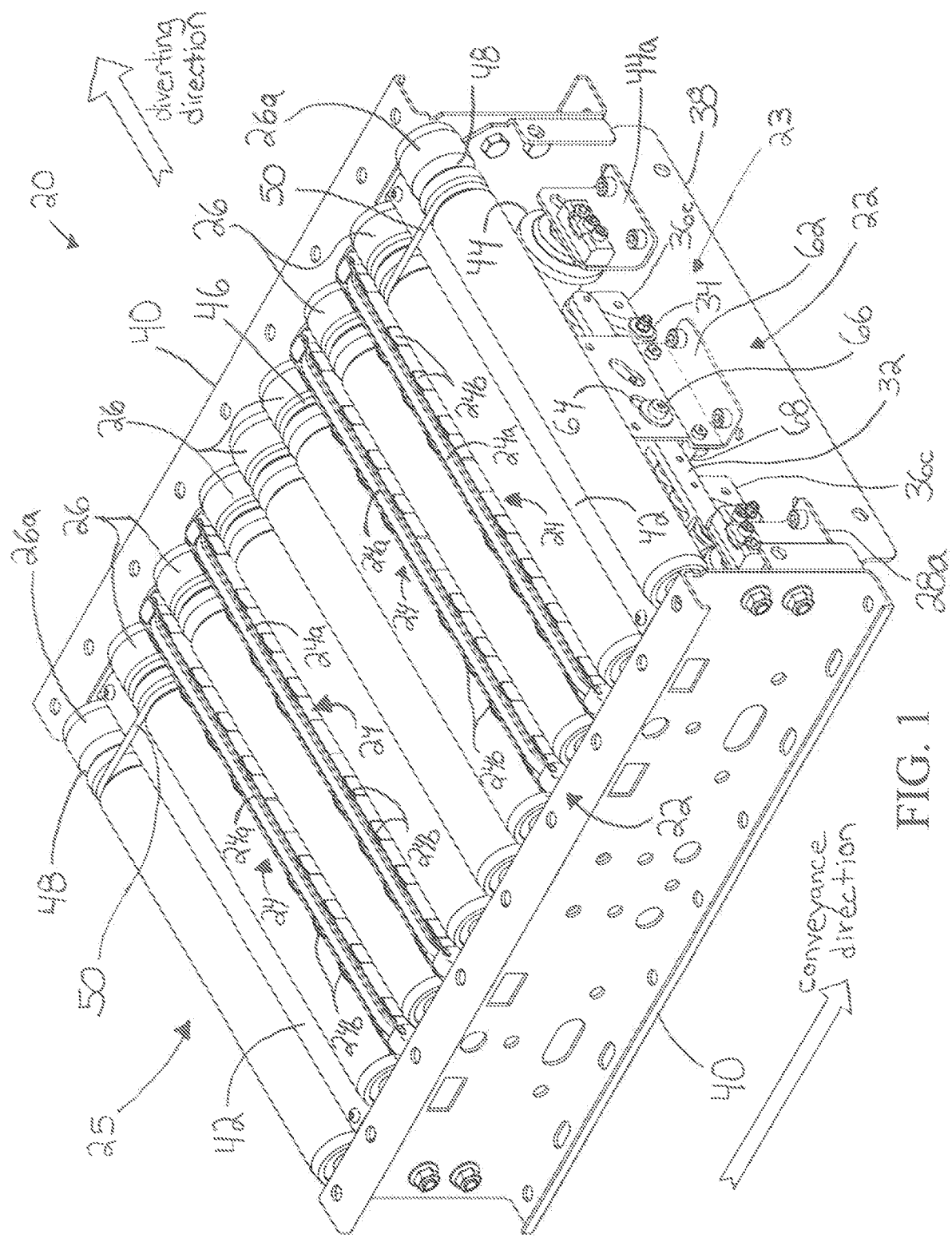
FIG. 1 is a perspective view of a right angle transfer device in accordance with an embodiment of the present invention.
Figure 2:
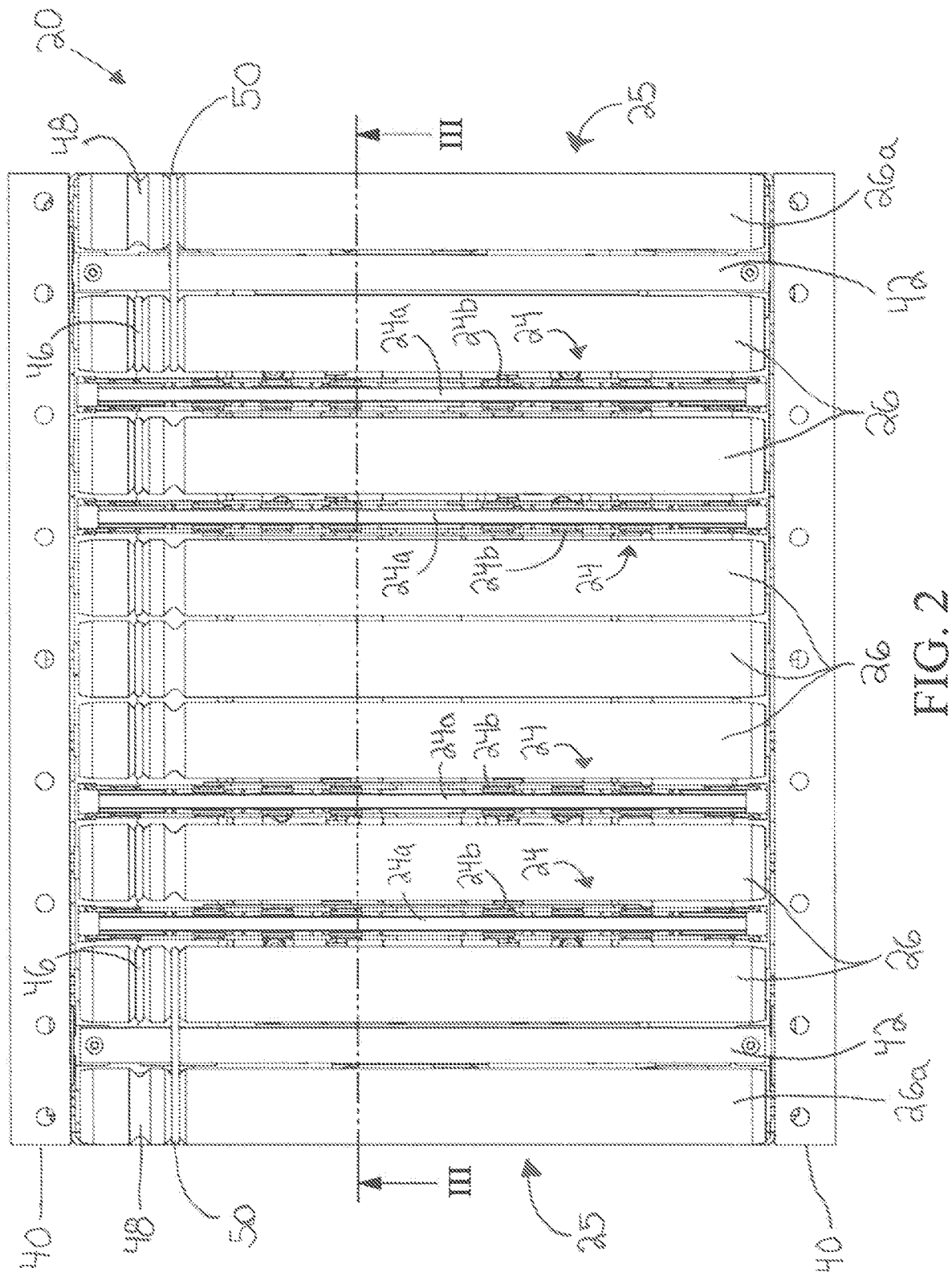
FIG. 2 is a top plan view of the right angle transfer device of FIG. 1.

Referring now to the drawings and illustrative embodiments depicted therein, a right angle transfer device 20 includes a conveyance surface 25 that moves objects in a conveyance direction and that is defined by a plurality of parallel driven conveyance rollers 26 mounted to a pair of side channels, or sidewalls 40, and an electrically-powered transfer assembly 22. Transfer assembly 22 includes a plurality of diverting conveyors 24 which in the illustrated embodiment are driven belts, and a lifting assembly 23 to selectively raise and lower the belts to transfer articles from conveyance surface 25. Lifting assembly 23 is operated by a bar 32 that undergoes substantially horizontal movement to lift the plurality of diverting conveyors 24 above the plurality of conveyance rollers 26 to thereby divert an object traveling in the conveyance direction to an alternate direction. An electrically-powered lift drive 28 rotates a cam, or helical cam 30, which in turn reciprocates bar 32 in a substantially horizontal direction via a cam follower 56. Two pairs of links in the form of a pair of frame links 34 and a pair of base links 68 are rotatably attached to bar 32. Frame links 34 are attached between bar 32 and a frame 36, and base links 68 are attached between bar 32 and a base 38. As bar 32 moves horizontally, frame links 34 are rotated from a more vertical orientation to a more horizontal orientation while base links 68 are simultaneously rotated from a more horizontal orientation to a more vertical orientation. The motion of frame links 34 in this manner causes frame 36—and diverting conveyors 24 which are mounted to frame 36—to move vertically. Diverting conveyors 24 are raised vertically upward in this fashion until contact is made with the object to thereby divert the object away from the conveyance direction. A significant portion of the vertical motion of diverting conveyors 24 is achieved through horizontal movement in lifting assembly 23. Due in part to these characteristics, right angle transfer device 20 has a low and compact profile, and is also highly versatile—requiring only electrical power to function.

Figure 3:
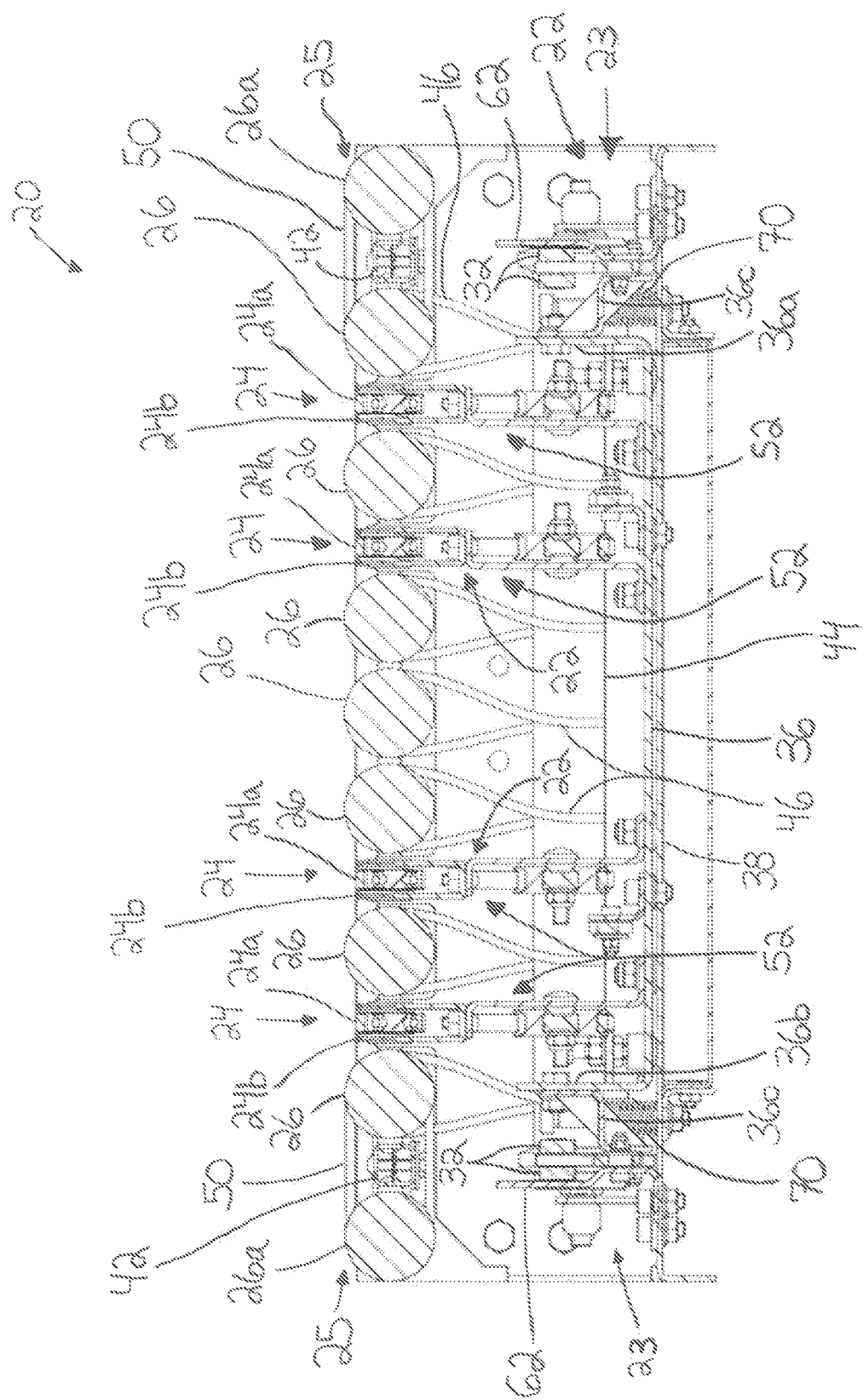
FIG. 3 is a cross sectional view of the right angle transfer device of FIG. 1, taken along the line of III-III of FIG. 2.
Figure 4:
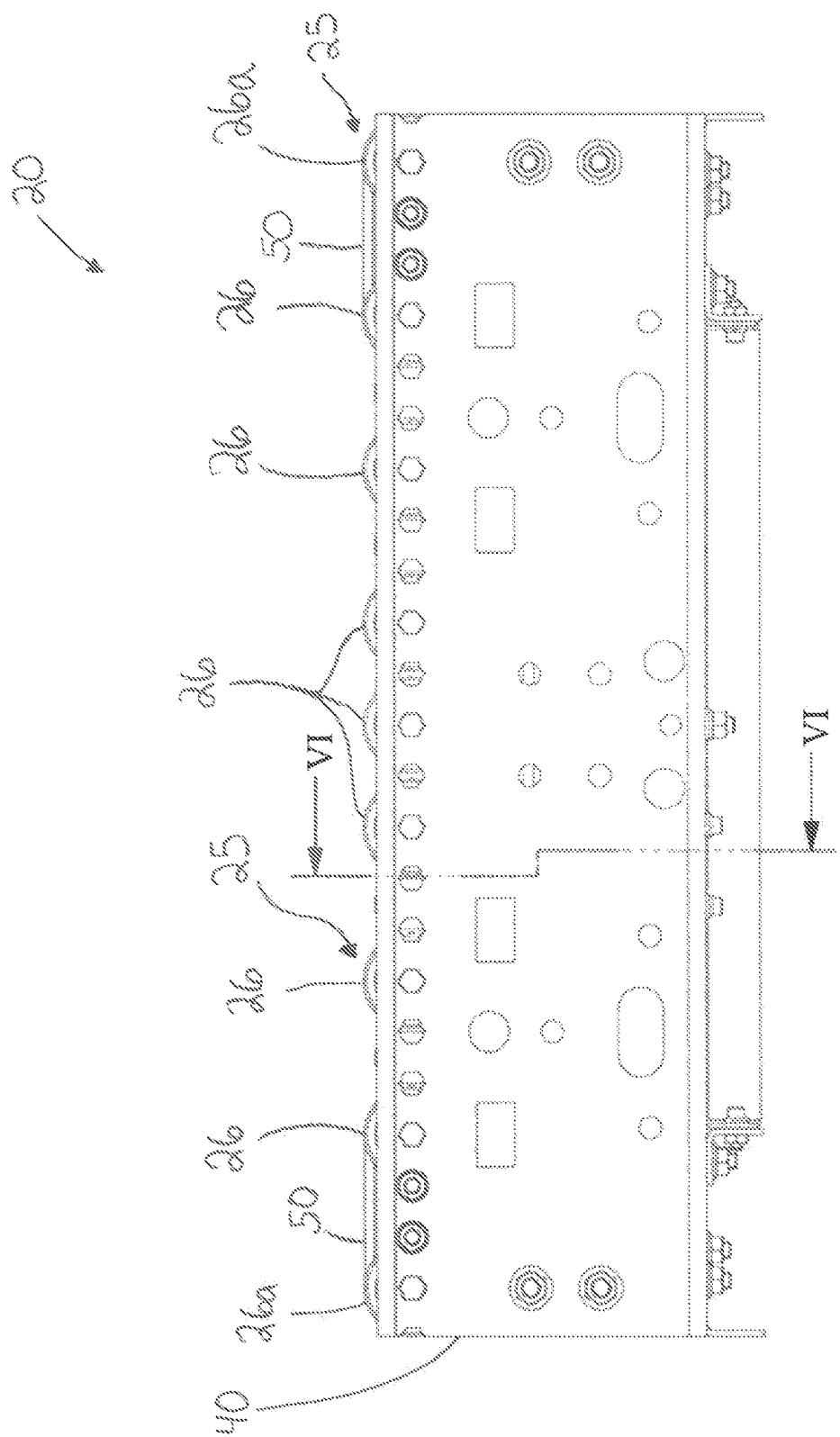
FIG. 4 is a side elevation view of the right angle transfer device of FIG. 1.
Figure 5:
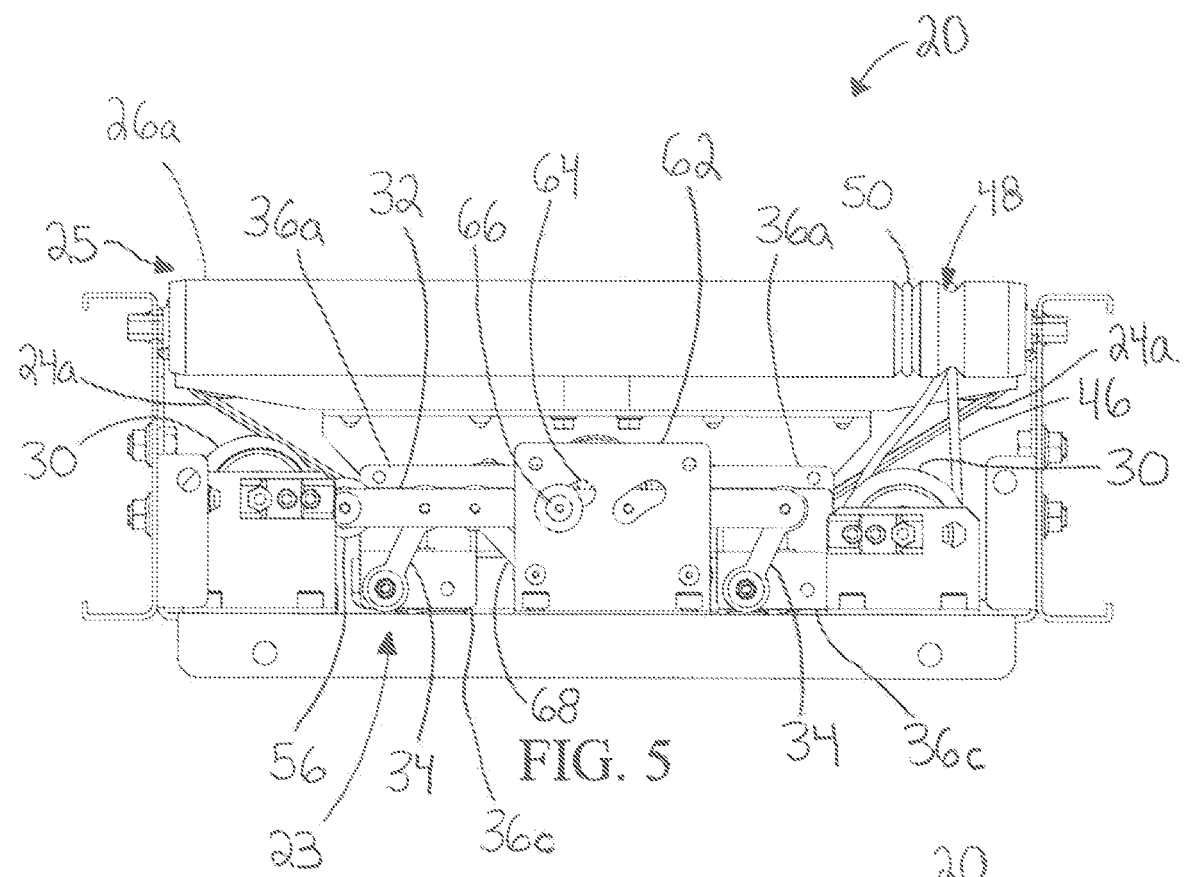
FIG. 5 is a front elevation view of the right angle transfer device of FIG. 1.

Referring now to the illustrated embodiment shown in FIGS. 1-4, right angle transfer device 20 includes base 38, sidewalls 40, and cross supports 42 that provide support for many of the components of right angle transfer 20, including conveying members or rollers 26. Conveying rollers 26 are cylindrically-shaped rollers that are mounted between sidewalls 40. An electrically-powered conveying drive 44 (FIGS. 3 and 6-8) drives a series of conveying drive bands 46 to rotate conveying rollers 26. Conveying drive 44 is a motorized or self-driven roller with an internal motor that can be energized to rotate an outer roller shell relative to an inner axle or shaft that is used to mount conveying drive 44. Opposing ends of conveying drive 44 are mounted to base 38 via conveying drive mounts 44*a*. Conveying drive bands 46 wrap around the exterior of both the roller shell of conveying drive 44 and a groove 48 defined on the exterior surface of each conveying roller 26. Conveying drive bands 46 are twisted to accommodate the perpendicular orientation and rolling direction of conveying drive 44 relative to that of conveying rollers 26 (FIG. 3). Each opposing end of the right angle transfer 20 has an idle conveying roller 26*a* that is not directly driven by conveying drive 44. Rather, a pair of O-ring bands 50 wrap around each cross support 42 to connect each idle conveying roller 26*a* to an adjacent conveying roller 26 such that the rotation of each idle conveying roller 26*a* is synchronous with its respective adjacent conveying roller 26. Conveying rollers 26 are driven by conveying drive 44 to transport or move an object in contact with one or more conveying rollers 26 in the conveyance direction, which is a direction that is generally perpendicular to a longitudinal axis of any given conveying roller 26.

Figure 6:
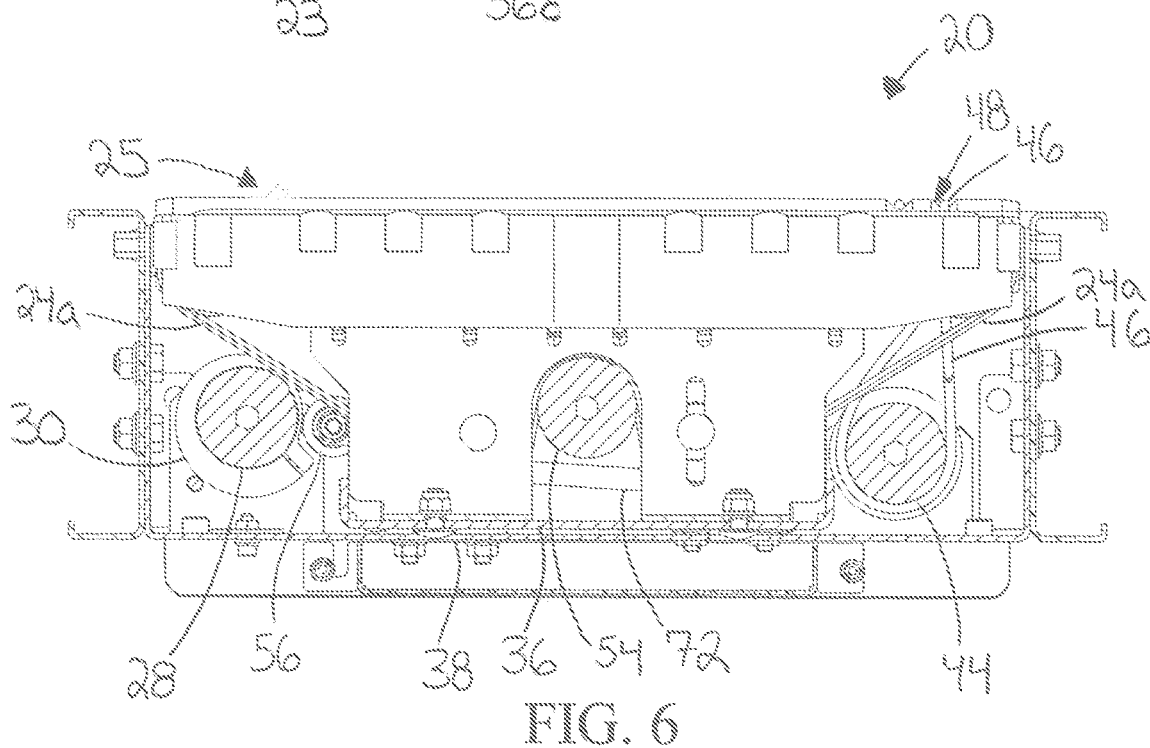
FIG. 6 is a cross sectional view of the right angle transfer device of FIG. 1, taken along the line of VI-VI of FIG. 4.
Figure 7:
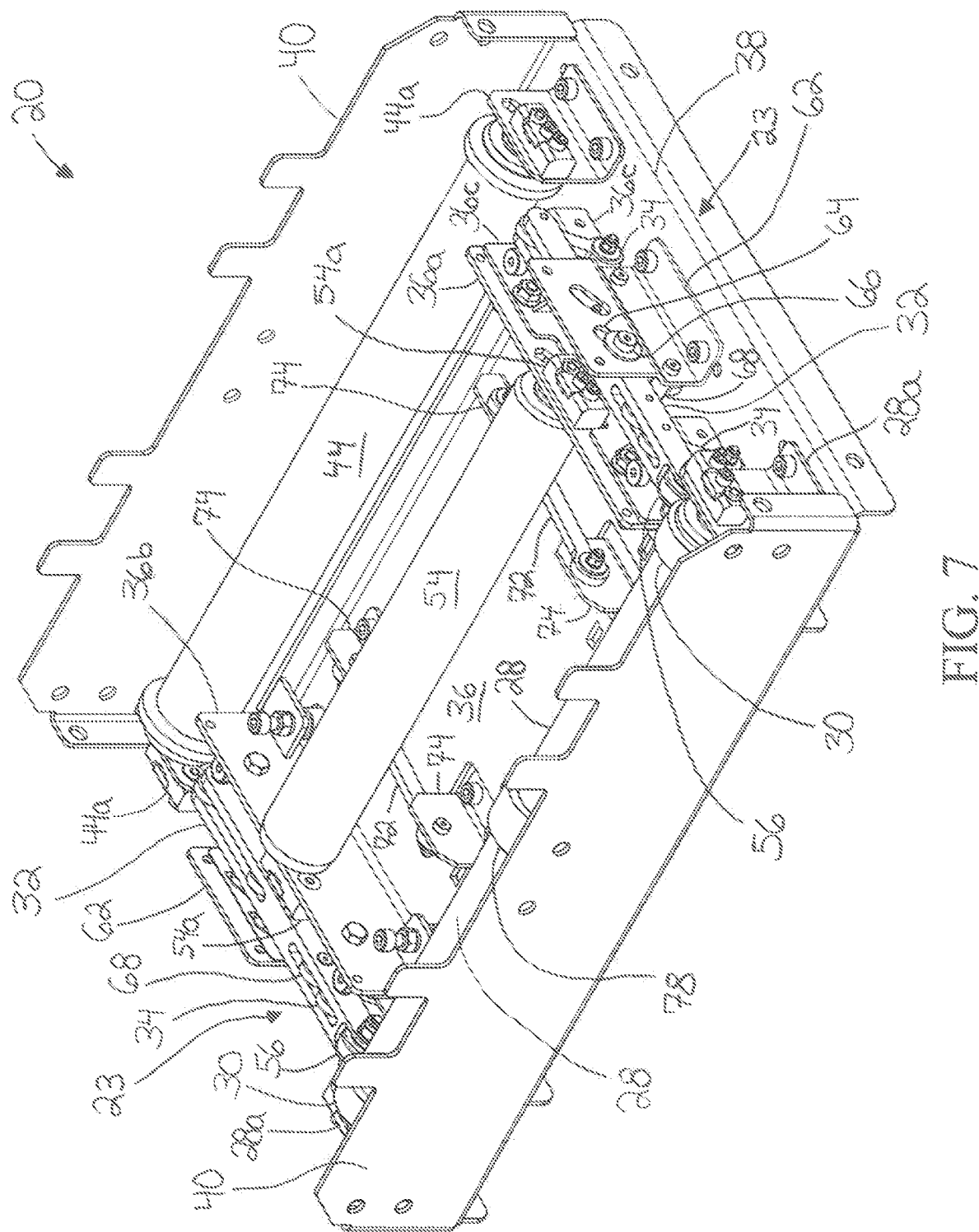
FIG. 7 is a perspective view of the right angle transfer device of FIG. 1, where a series of conveying members and diverting conveying members have been removed from the figure to reveal additional details.
Figure 8:
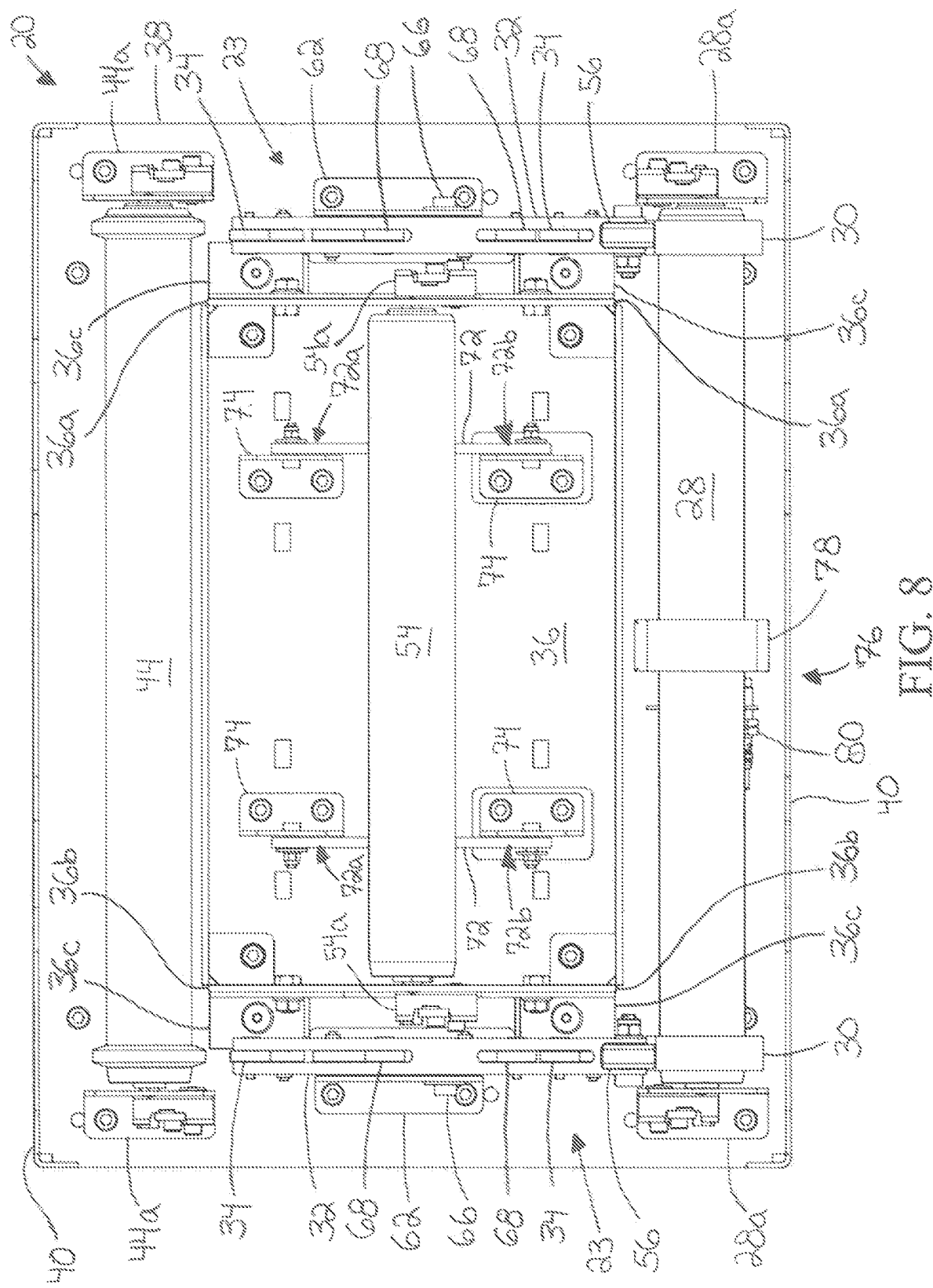
FIG. 8 is a top plan view of FIG. 7.

Referring again to FIGS. 1-3, a series of diverting conveyors 24 are interspersed between conveying rollers 26, and each include a diverting belt 24*a* that is supported by a series of spaced apart grooved wheels or blades 24*b*. Each blade 24*b* is mounted to frame 36 via a blade mount 52. Diverting drive 54 (FIG. 7), which in the illustrated embodiment is a motorized or self-driven roller resembling that of conveying drive 44, drives diverting belt 24*a* in a diverting direction (FIGS. 6-8). Opposing ends of diverting drive 54 are mounted to respective frame walls 36*a*, 36*b* via diverting mounts 54*a*. As shown in FIG. 1, in the illustrated embodiment the diverting direction is approximately perpendicular to the conveyance direction. However, it should be appreciated that the diverting direction in which a diverting belt may be driven could be any direction at an angle from the conveyance direction.

With reference to FIGS. 6-8, electrically-powered lift drive 28 is a motorized or self-driven roller that resembles both conveying drive 44 and diverting drive 54. Opposing ends of lift drive 28 are mounted to base 38 via lift drive mounts 28*a*. A cam 30 in the form of a helical or nautilus-shaped cam is mounted near each opposing end of lift drive 28 such that each cam 30 rotates in sync with lift drive 28. Cam followers 56 engage or contact respective cams 30 as each cam 30 rotates. It should be understood that an electrically-powered drive, such as a lift drive, could also be a driven shaft that is powered by an external servo or other drive source.

Referring now to FIGS. 1, 3, 5 and 7-14, a pair of lifting assemblies 23 are located near opposing ends of right angle transfer 20 such that lifting assemblies 23 are outboard of and adjacent to a first side and a second side of frame 36, or near outer sides of frame walls 36*a* and 36*b* respectively. Bar 32 is connected to and supports cam follower 56 such that any lateral or linear movement of cam follower 56 is translated into identical movement of bar 32. A base bracket 62 is coupled to base 38 and defines a slot, or curved slot 64. A projection 66 is connected to bar 32 so as to have identical or synchronous movement with bar 32. Projection 66 is also connected to bracket 62 to such that that it is slidable within slot 62 as bar 32 moves. In this way, the lateral motion of bar 32 resulting from cam 30 rotating to laterally move cam follower 56 is translated into semi-vertical, curved, or angled motion due in part to mechanical linkages, such as base links 68 discussed below, in which the sliding connection between projection 66 and slot 64 helps to stabilize and/or support bar 32 while bar 32 is in motion.

Figure 10:
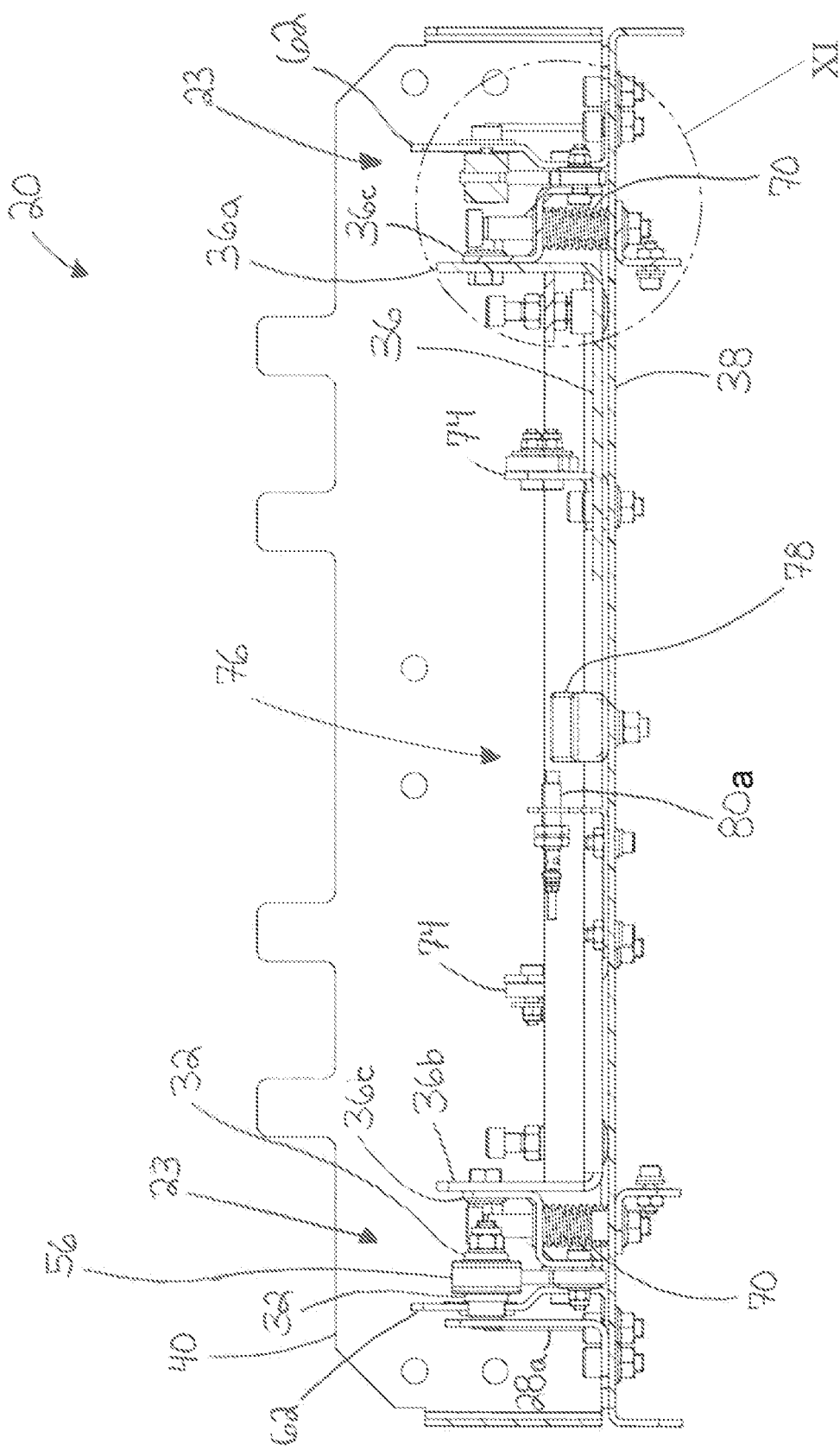
FIG. 10 is a cross sectional view of the right angle transfer device of FIG. 1, taken along the line of X-X of FIG. 9.
Figure 11:
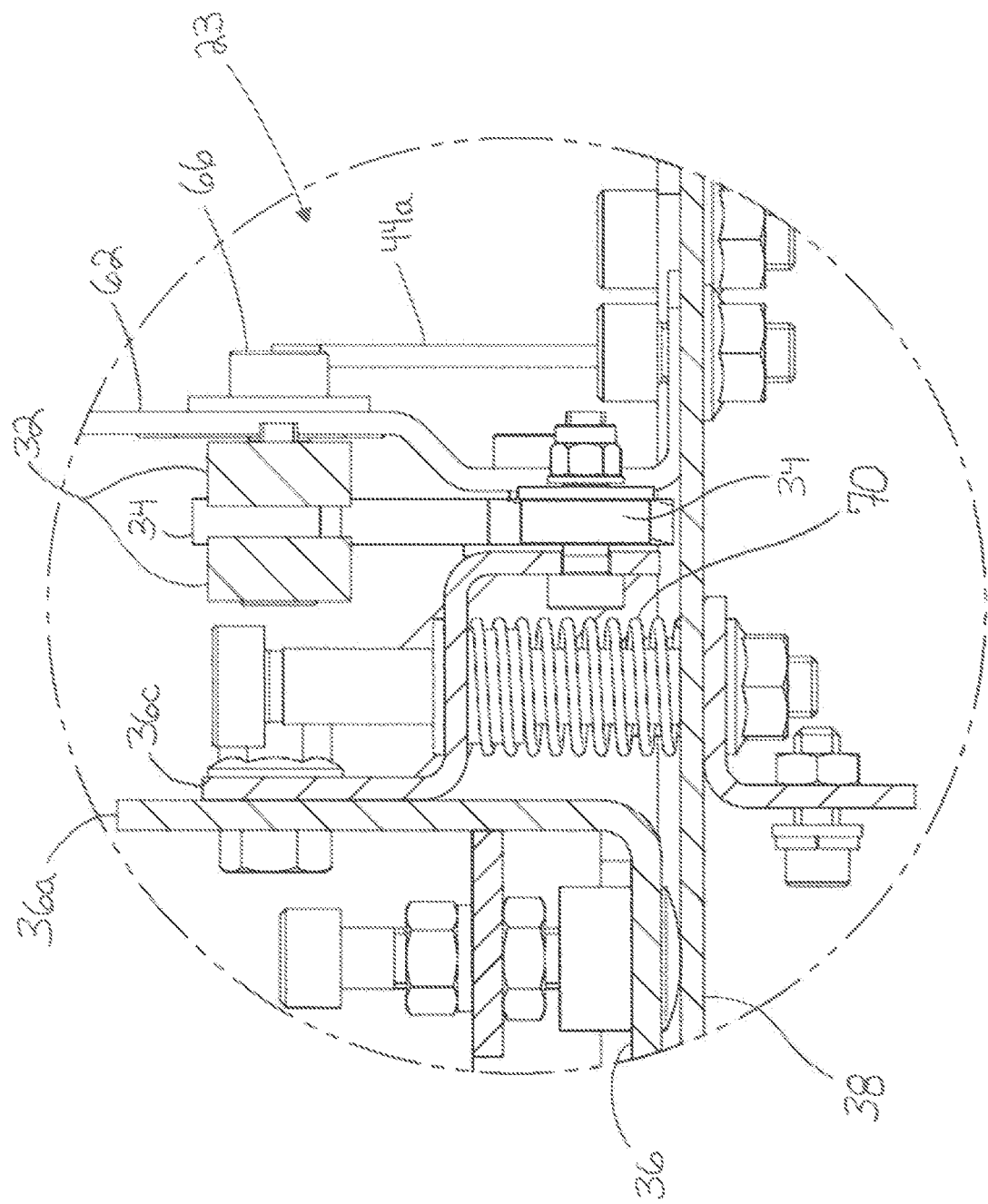
FIG. 11 is an enlarged view of the area designated XI in FIG. 10, showing a portion of a lifting assembly.
Figure 12:
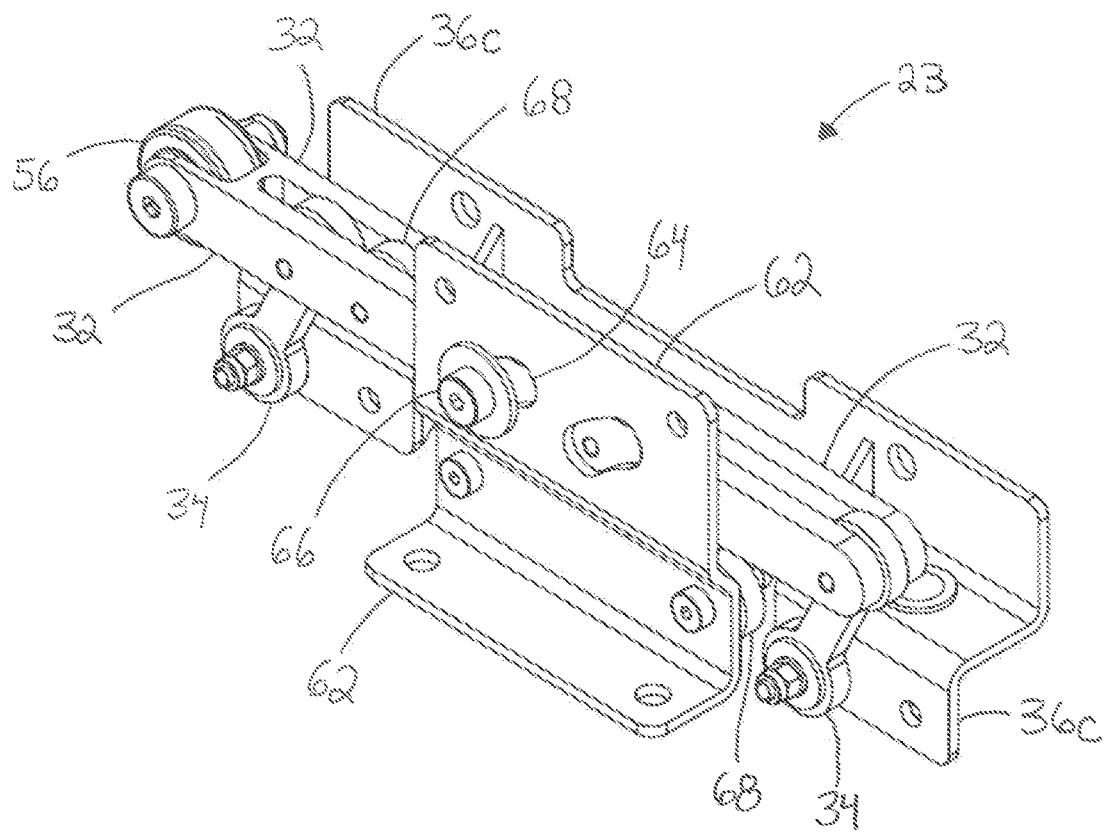
FIG. 12 is a perspective view of the lifting assembly of the right angle transfer device of FIG. 1, where the lifting assembly is shown in isolation.
Figure 13:
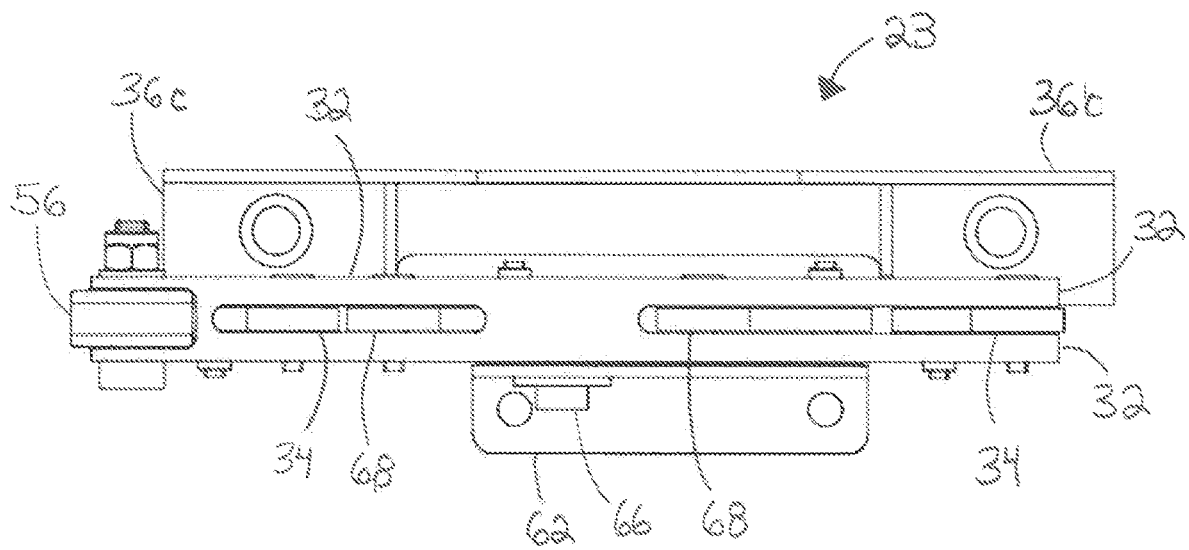
FIG. 13 is a top plan view of the lifting assembly.
Figure 14:
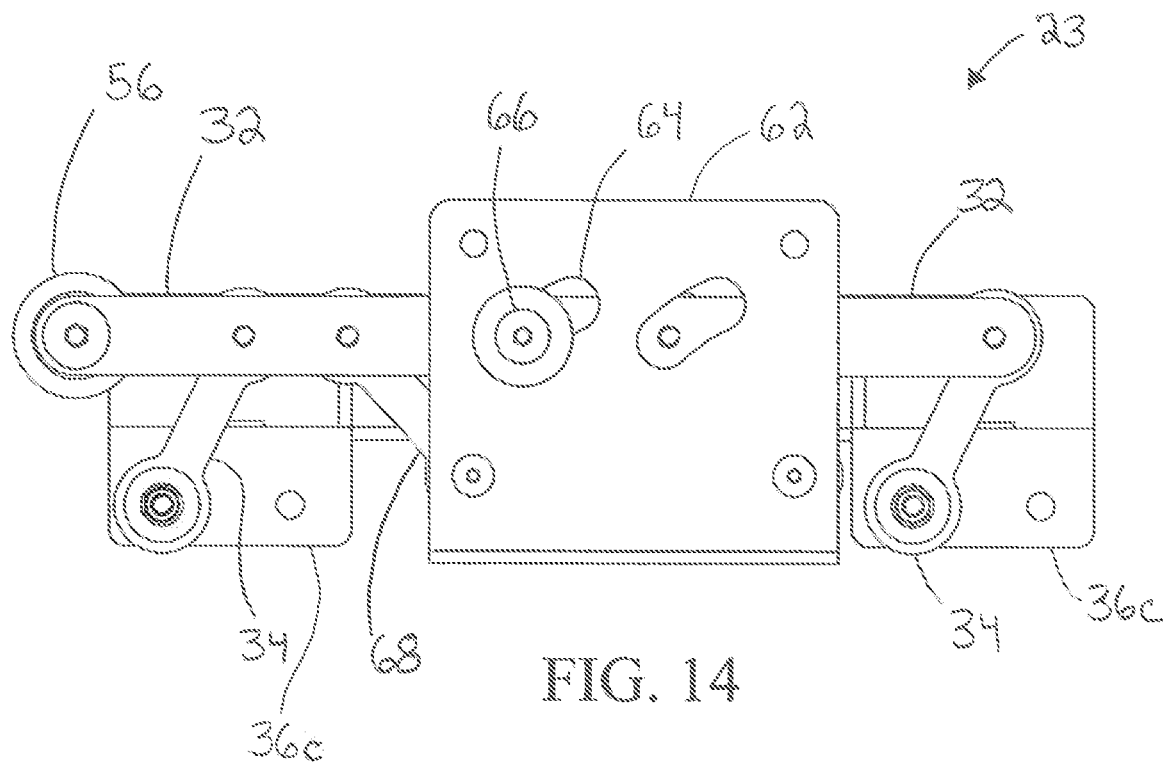
FIG. 14 is a front elevation view of the lifting assembly.
Figure 15:
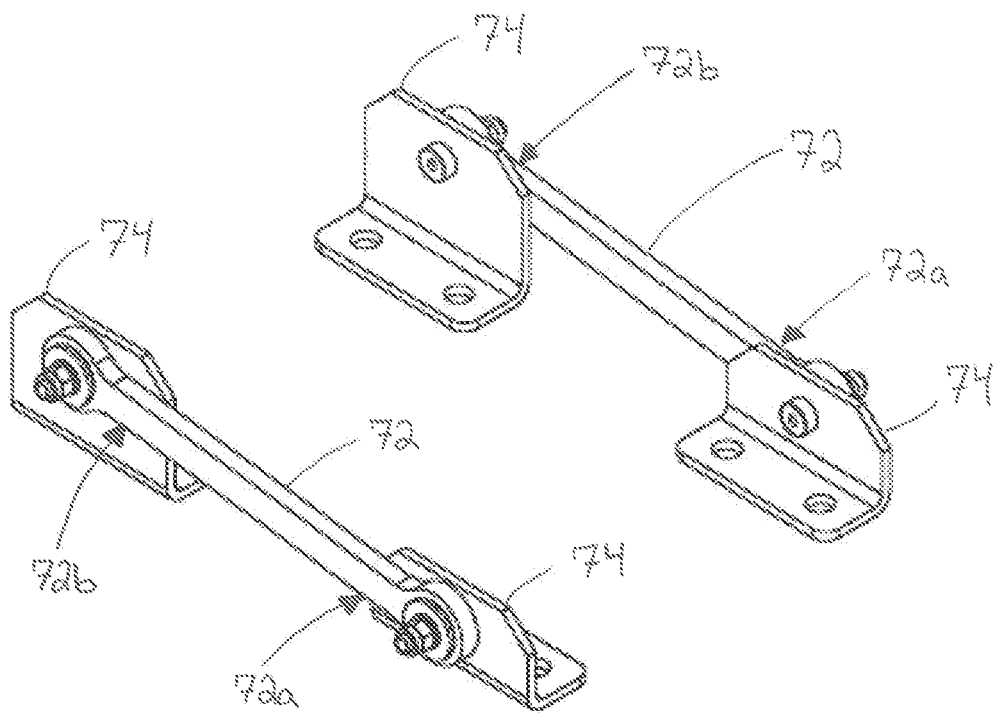
FIG. 15 is a perspective view of a pair of stabilizing supports of the right angle transfer device of FIG. 1, where the stabilizing supports are shown in isolation.
Figure 16:
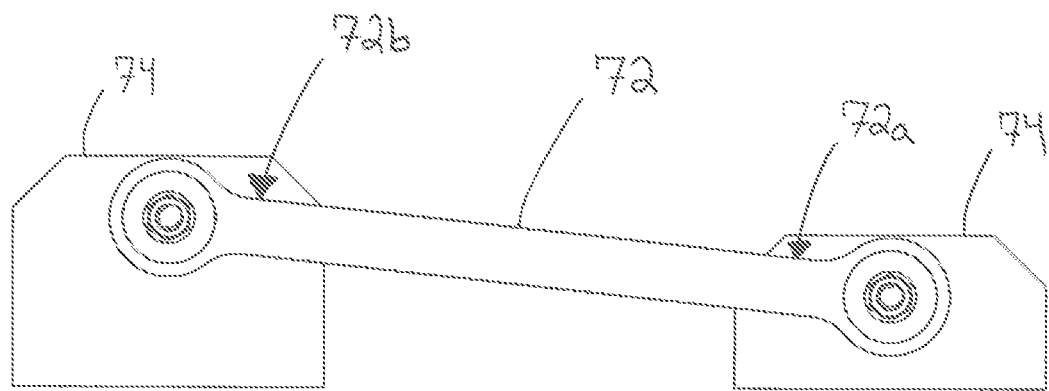
FIG. 16 is a side elevation view of the stabilizing supports.

Referring specifically to FIGS. 10-14, each lifting assembly 23 further includes two pairs of links connected to bar 32 in the form of a pair of spaced apart parallel frame links 34, and the pair of spaced apart parallel base links 68 located between frame links 34. Each frame link 34 is rotatably connected between bar 32 and a frame bracket 36*c* that is attached to frame 36, while each base link 68 is rotatably connected between bar 32 and base bracket 62. Movement of bar 32 causes both frame links 34 and base links 68 to rotate. Rotation of frame and base links 34, 68 is such that one pair of links will always become more vertical while the other pair of links becomes more horizontal, and vice versa. For example, during the lifting of frame 36, lift drive 28 rotates in a lifting direction to urge bar 32 away from lift drive 28. As bar 32 moves away from lift drive 28, frame links 34 will go from a more vertical position to a more horizontal position, while base links 68 concurrently go from a more horizontal position to a more vertical position. As frame links 34 become more horizontal, they lift frame bracket 36*c*, and therefore frame 36, vertically upward and away from base 38. In this way, frame and base links 34, 68 counteract one another to stabilize and balance the vertical motion of frame 36, the forces resulting from the vertical motion of frame 36, and the forces required to lift frame 36. Additionally, the rotational motion or path of base links 68 determine at least in part the motion of bars 32 as it moves in response to the motion of cam followers 56. As shown in FIGS. 10 and 11, a damping assembly 69 includes a resilient member in the form of spring 70 that is connected between a lower end of each frame bracket 36*c* and base 38, and a shock-absorbing bumper 71 (FIG. 10) in the form of a nut over molded with shock-absorbing plastic and coupled proximate the location at which spring 70 contacts base 38. Spring 70 is coiled around a shoulder bolt 73 that guides and supports spring 70. Collectively, spring 70 and bumper 71 each serve as a dampening contact between frame 36 and base 38 when frame 36 is lowered from a raised position. Additionally, spring 70 is sized to counteract a portion of the weight of frame 36 and components and/or objects supported by frame 36, such as diverting conveying members 24. That is, spring 70 provides an upward biasing force that acts upon frame 36 and components are objects supported by frame 36. Preferably, spring 70 is sized to counteract the majority of the weight of frame 36, thus reducing the work and/or energy required by lift drive 28 needed to lift frame 36 when lift drive 28 is rotating in the lifting direction. The combination of two lifting assemblies 23 located on opposing adjacent sides of frame 36 and being simultaneously and synchronously driven by lift drive 28 ensures a square lift, and further supports the relatively stable and balanced vertical motion of frame 36.

Referring to FIG. 3, as previously mentioned, blades 24b are mounted to frame 36 via blade mounts 52. Therefore, as frame 36 is raised and lowered as described above, blade mounts 52 cause blades 24b to be identically raised and lowered between a lowered position and a raised position. In the lowered position, diverting belts 24a are positioned below the conveying rollers 26, whereby an object would be conveyed in the conveyance direction at a height in which the object is in contact with conveying rollers 26. In the raised position, diverting belts 24a are located above the conveying rollers 26, whereby the object being conveyed is lifted above conveying rollers 26 by diverting belts 24a such that diverting belts 24a convey the object in the diverting direction away from the conveyance direction.

Figure 9:
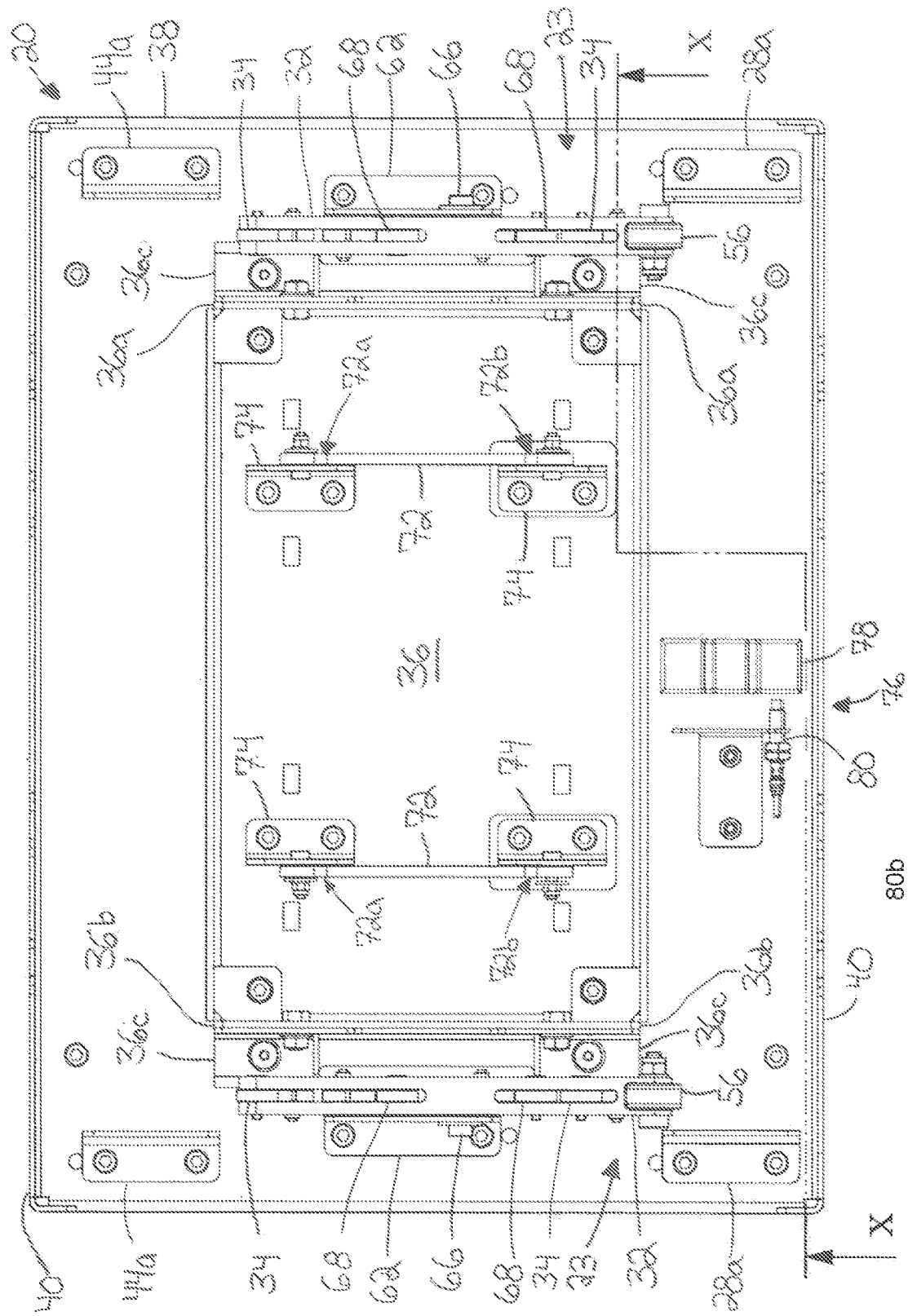
FIG. 9 is the top plan view of FIG. 8, where a lift drive, conveying drive, and diverting drive have all been additionally removed from the figure to reveal additional details.

Referring now to FIGS. 8-10, the rotation of lift drive 28 to raise and lower diverting conveyors 24 mounted to frame 36 is controlled by a lift drive control system 76. Lift drive control system 76 includes a flag 78 that is mounted to lift drive 28, a first flag sensor 80a, an optional second flag sensor 80b (FIG. 9), in which flag sensors 80a, 80b are adapted to detect flag 78, and a controller (not shown) adapted to send, recognize, and receive electronic signals between flag sensors 80a, 80b and lift drive 28. Flag 78 is connected to a portion of a collar that is attached around the outer circumference of lift drive 28, such that flag 78 rotates synchronously with lift drive 28. Flag 78 may be sensed optically and/or include a magnet or other detectable element that can be sensed by flag sensors. Flag sensors 80a, 80b are photo optic sensors, but could alternatively be or include magnetic and/or other sensors necessary to detect a flag. Flag sensors 80a, 80b are mounted to base 38 in positions that allow flag sensors 80a, 80b to sense when flag 78 has been rotated in front of flag sensors 80a, 80b. Flag 78 is positioned on lift drive 28 such that flag 78 is rotated in front of second flag sensor 80b when lift drive 28 has rotated to a position that results in diverting conveyors 24 being located above conveying rollers 26 so as to divert an object in the diverting direction. The controller recognizes a second stop signal, such as a 24 volt electric signal that is dropped or cut-off between second flag sensor 80b and the controller, once flag 78 has been rotated in front of second flag sensor 80b or otherwise in a position in which second flag sensor 80b senses flag 78. After recognizing the second stop signal, the controller then commands or causes lift drive 28 to de-energize, stop, or otherwise alter its rotation from the lifting direction. Additionally, a hard stop is mounted to base 38 that would make physical contact with flag 78 to stop rotation of lift drive 28 in the event that second flag sensor 80b fails to sense flag 78. The hard stop is also configured to more precisely stop rotation of lift drive 28 in order to prevent over travel of cam 30. First sensor 80a works in a similar fashion as described above with regard to second sensor 80b recognizing flag 78 and then cutting off a signal to the controller. However, flag 78 is rotated in front of first sensor 80a at a position in which lift drive 28 has rotated in the lowering direction to an extent that diverting conveyors 24 are located below conveying rollers 26. A first stop signal may be recognized by the controller once flag 78 has been sensed by first sensor 80a, in which the controller commands or otherwise causes lift drive 28 stop or otherwise alter its rotation from a lowering direction. It should be appreciated that the positions or other characteristics of one or more flag sensors, such as first and second flag sensors 80a, 80b, could be different or switched depending on which directions a lift drive rotates to raise and lower a frame, or in what orientation or position a flag is mounted to a lift drive. Optionally, a lift drive control system could also be used in a similar manner to detect other positions of diverting conveyors 24 via the rotational position of lift drive 28 and one or more flags and/or flag sensors. It will be appreciated that a flag and flag sensor may come in many forms within the scope of the present invention.

Figure 17:
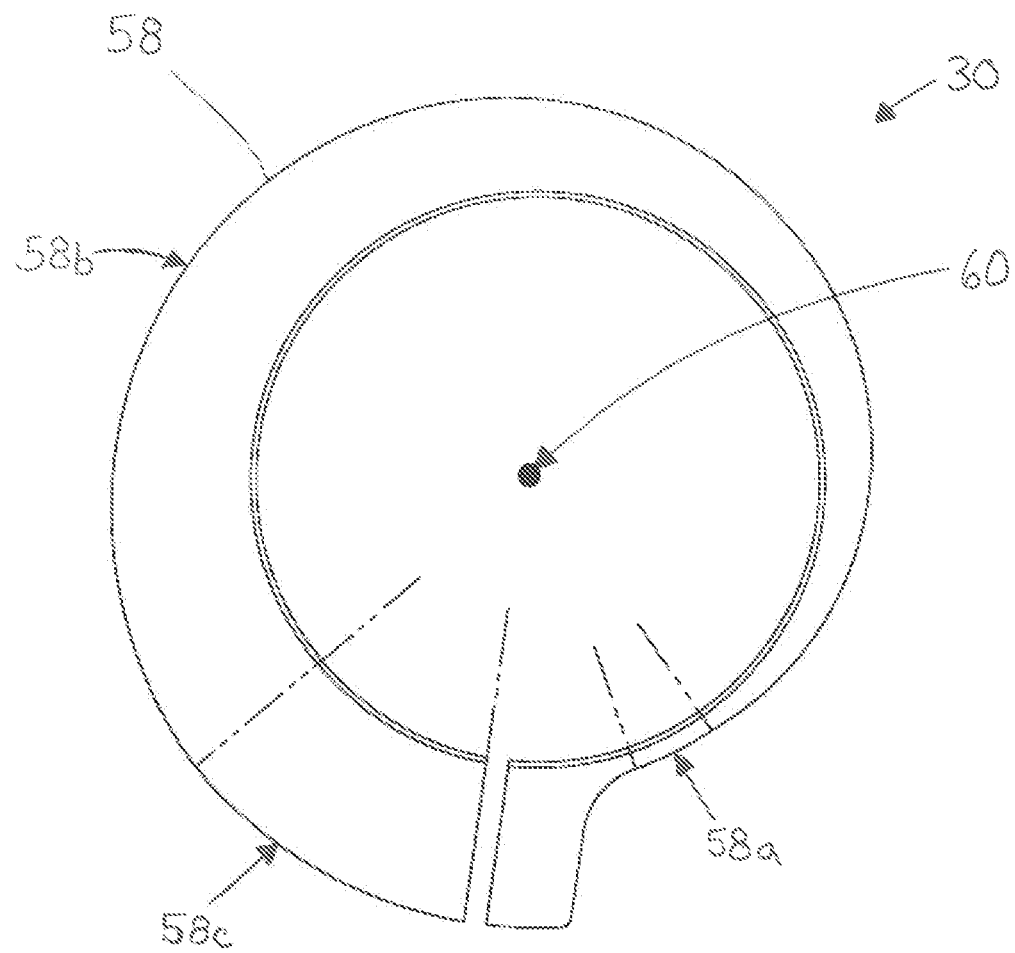
FIG. 17 is a side elevation view of a helical cam shown in isolation.

As best shown in FIG. 17, each cam 30 has an outer cam profile 58 which represents the outermost surface of cam 30, and a central rotation point 60 which represents the point about which cam 30 rotates, and which is also aligned with a longitudinal axis of lift drive 28. The cam profile 58 includes a startup section 58a, a helical section 58b, and a holding section 58c. Both the startup and holding sections 58a, 58c have a constant curvature. That is, the distance between any point on the outermost surface of startup section 58a relative to central rotation point 60 will be the same. Likewise, the distance between any point on the outermost surface of holding section 58c relative to central rotation point 60 will also be the same. Therefore, cam follower 56 does not experience any lateral movement while it is in rotational contact with either startup section 58a or holding section 58c. In this way, both startup section 58a and holding section 58c are "flat" sections insofar as they do not cause lateral movement of cam follower 56. On the other hand, the radial distance between central rotation point 60 and helical section 58b continuously increases at a constant rate upon rotation of cam 30. This geometry or shape has the resulting effect of causing cam follower 56 to move laterally or linearly towards or away from central rotation point 60 at a constant rate while cam follower 56 is in contact with helical section 58b and cam 30 is rotating at a constant rate. Additionally, cam follower 56 is not in contact with at least a portion of startup section 58a, such that any momentum resulting from frame 36 moving downward or lowering is not abruptly transferred to lift drive 28. Furthermore, cam 30 may include or define bump stops that also serve to prevent undesired excess momentum transfer between lift drive 28 and frame 36 while frame 36 is being lowered.

Lift drive 28 experiences various counter forces during its rotation of cam 30 while cam 30 is moving cam follower 56. This is because lift drive 28 is ultimately supplying the force necessary to move cam follower 56 and the various additional mechanical components connected to cam follower 56 needed to raise and lower frame 36. The counter forces acting on lift drive 28 reduce the efficiency and operational lifetime of lift drive 28. The design of cam profile 58 mitigates the impact that the counter forces acting on lift drive 28 in several ways. For example, as discussed above, startup section 58a of cam 30 has a constant curvature that does not move cam follower 56. This enables lift drive 28 to begin rotation in a lifting direction, in which frame 36 is raised, and build up momentum and torque under minimal counter force before reaching helical section 58b where lift drive 28 begins moving cam follower 56 to lift frame 36. Similarly, holding section 58c of cam 30 also has a constant curvature that minimizes the force required by lift drive 28 to hold frame 36 in a raised position before lift drive 28 is reversed to rotate in the lowering direction, in which lift drive 28 may rotate in the lowering direction in a de-energized or non-powered state. For example the force of gravity acting on frame 36 may cause the weight of at least frame 36 to be transferred through intervening components, such as bar 32, cam follower 56, cam 30, etc., to reverse the rotation of lift drive 28, thereby allowing frame 36 to move downward or be lowered. Lift drive 28 rotates to move frame 36 vertically while cam follower 56 is in contact with helical section 58b of cam 30. As discussed above, helical section 58b has a curvature that changes at a constant rate to result in constant linear movement of cam follower 56. Therefore, the resulting counter forces acting on lift drive 28 while it is raising or lowering frame 36 are substantially linear in nature insofar as the counter forces change at a constant rate. This serves to prevent rapid or large changes in force acting on lift drive 28. Additionally, this also allows the torque output required by lift drive 28 while frame 36 is being raised to remain substantially constant through the duration of the lift. Accordingly, the collective configuration and design of startup section 58a, helical section 58b, and holding section 58c of cam profile 58 increase the overall efficiency, effectiveness, reliability, and lifetime of lift drive 28.

Referring now to FIGS. 7-9 and 15-16, a pair of spaced apart stabilizing supports 72 are rotatably mounted between frame 36 and base 38 via support brackets 74. As frame 36 is raised and lowered, a frame end 72a of each stabilizing support 72 is also raised and lowered, while the elevation of a base end 72b of each stabilizing support 72 remains fixed. Accordingly, the angle of each stabilizing support 72 is dependent on the height position of frame 36 relative to base 38, and changes while frame 36 is in the process of being raised or lowered. In this way, stabilizing supports 72 are able to provide continuous support to frame 36 as frame 36 is raised and lowered.

Figure 18:
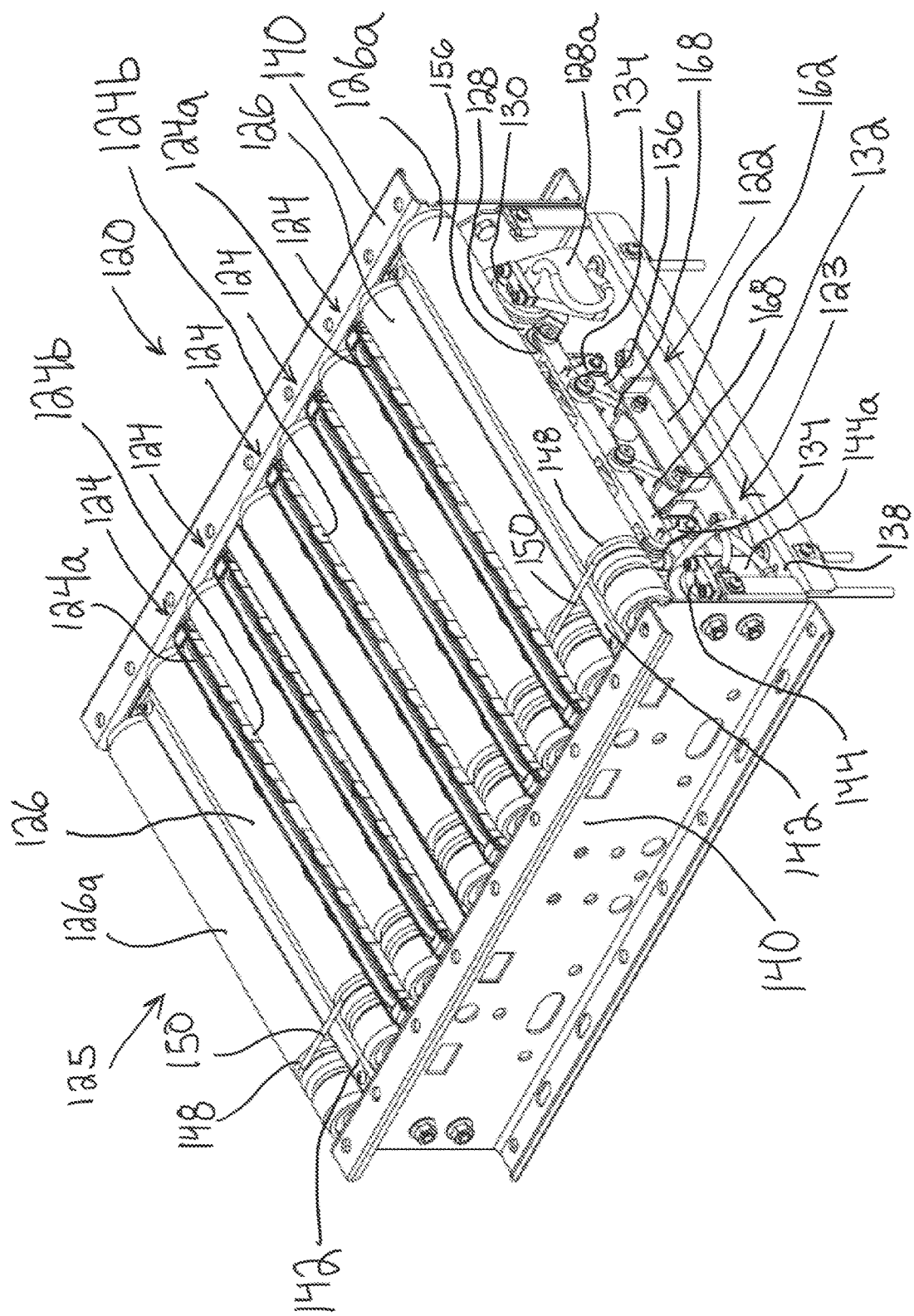
FIG. 18 is a perspective view of another right angle transfer device in accordance with another embodiment of the present invention.

Referring now to the illustrated embodiment of FIG. 18, another right angle transfer 120 is shown that is similar to right angle transfer 20, with similar features of right angle transfer 120 relative to right angle transfer 20 being designated with like reference numbers, but with "100" added to each reference number of right angle transfer 20. Due to the similarities of right angle transfer 120, not all of the components and features of right angle transfer 120 are discussed herein. As shown, right angle transfer 120 has a base 138 that supports a pair of opposing sidewalls 140, a transfer assembly 122, and a lifting assembly 123. A lift drive 128 is coupled to base 138 via lift drive mounts 128a, and rotationally engages a cam 130 coupled to a cam follower 156, and a bar 132. A pair of frame links 134 are coupled between bar 132 and a frame 136, and a pair of base links 168 are coupled between bar 132 and a bracket 162, in which base links 168 are more thick as compared to base links 68, and have dual ends or a yoke-like structure to provide increased stability to bar 132 and other components coupled to bar 132. Additionally, bracket 162 is shortened as compared to bracket 62, and does not define a slot. A series of diverting conveying members 124 include diverting belts 124a, blades 124b, and are interspersed between conveying members 126 and outer conveying members 126a that form a conveyance surface 125. Conveying members 126 are driven by a conveying drive 144 mounted to base 138 via a conveying drive mounts 144a, and are coupled to outer conveying members 126a via O-ring bands 150 that extend around grooves 148 in outer conveyance members 126a. Although not visible in FIG. 18, right angle transfer 120 also includes a diverting drive, diverting drive mounts, and blade mounts. Cam 130 has a cam profile that includes a startup section, a helical section, a holding section, and a central rotation point, and may have geometry and/or features that resemble cam 30 in many aspects.

Accordingly, the right angle transfer device of the present invention provides a spatially compact and low profile way to selectively convey or transport an object in a conveyance direction or diverting direction without the need for pneumatic components or a pneumatic supply source. A conveyance surface is defined by a plurality of conveying members, and is used to move objects in a conveyance direction. A lift drive rotates a cam to move a bar in a substantially horizontal direction. A series of mechanical links connected to the bar rotate to lift a frame as the bar is moved horizontally. A plurality of diverting conveying members are mounted to the frame, whereby the diverting conveying members are raised above the conveying members as the frame is raised. As the diverting conveying members are raised above the conveying members, the object is lifted off the conveying members by the diverting conveying members and subsequently diverted away from a conveyance direction by the diverting conveying members.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A right angle transfer, comprising:
   a base;
   a plurality of conveying members that define a conveyance surface, said conveying members drivable to convey an object in a conveyance direction;
   a diverting conveying member that is drivable to divert the object at an angle from said conveyance direction;
   a frame that mounts said diverting conveying member for general vertical movement with respect to said conveying members and said base;
   a lift drive; and
   a lifting assembly comprising:
      a cam coupled to said lift drive;
      a bar coupled to said cam; and
      a frame link coupled to said bar and to said frame;
   wherein said lift drive is configured to rotate said cam;
   wherein rotation of said cam urges said bar horizontally; and
   wherein said frame link vertically raises and lowers said frame with respect to said conveying members when said bar is urged horizontally.

2. The right angle transfer of claim 1, wherein said cam comprises a first cam coupled to said lift drive at a position that is laterally adjacent a first side of said frame, and wherein said lifting assembly further comprises a second cam coupled to said lift drive at a position that is laterally adjacent a second side of said frame opposite said first side of said frame, a second bar coupled to said second cam, and a second frame link coupled to said second bar and said frame, wherein said lift drive is configured to rotate said second cam, wherein said second bar is urged horizontally when said second cam rotates, and wherein said second frame link vertically raises and lowers said frame with respect to said conveying members when said second bar is urged horizontally.

3. The right angle transfer of claim 1, wherein said lift drive comprises an electrically-powered motorized roller having a motor mechanism internal to a roller shell.

4. The right angle transfer of claim 1, further comprising a resilient member coupled to said frame and said base and configured to counteract the majority of the weight of said frame.

5. The right angle transfer of claim 1, wherein said lift drive is configured to rotate said cam in a lifting direction to urge said bar in a first horizontal direction, thereby raising said frame relative to said conveyance surface, and wherein said lift drive is configured to rotate in a lowering direction, wherein said bar moves in a second horizontal direction opposite said first horizontal direction, and wherein said frame is lowered relative to said conveyance surface.

6. The right angle transfer of claim 5, wherein said cam comprises an outer cam profile, and a central rotation point about which said cam rotates, said outer cam profile comprising a helical section in which the radial distance between said central rotation point and said helical section changes at a constant rate along the length of said helical section.

7. The right angle transfer of claim 6, wherein said cam profile further comprises a startup section, wherein the radial distance between said central rotation point and said startup section remains constant along the length of said startup section, and wherein said startup section determines the horizontal displacement of said bar when said cam begins to rotate in said lifting direction.

8. The right angle transfer of claim 7, wherein said cam profile further comprises a holding section, wherein the radial distance between said central rotation point and said holding section remains constant along the length of said holding section, and wherein said holding section is configured to determine the horizontal displacement of said bar when said cam begins to rotate in said lowering direction.

9. The right angle transfer of claim 1, further comprising an electrically-powered diverting drive that drives said diverting conveying member.

10. The right angle transfer of claim 9, wherein said diverting drive is energized while said diverting conveying member is being raised vertically upward.

11. The right angle transfer of claim 10, further comprising a pair of spaced-apart stabilizing supports coupled to said frame and to said base, each of said stabilizing supports oriented relative to said frame at a stabilization angle that changes as said frame moves vertically.

12. The right angle transfer of claim 1, wherein said lifting assembly further comprises a base link coupled to said bar and to said bracket and being oriented relative to said bar at a base link angle, wherein said frame link is oriented relative to said bar at a frame link angle, wherein as said bar is urged horizontally each of said frame link and said base link angles change, wherein said frame link angle increases when said base link angle decreases, and wherein said frame link angle decreases when said base link angle increases.

13. The right angle transfer of claim 12, wherein said frame link comprises a first frame link, wherein said base link comprises a first base link, wherein said lifting assembly further comprises a second frame link and a second base link, wherein said second frame link is coupled to said bar and to said frame, wherein said second base link is coupled to said bar and to said bracket, wherein said second frame link is oriented parallel to said first frame link, and wherein said second base link is oriented parallel to said first base link.

14. The right angle transfer of claim 1, further comprising a lift drive control adapted to control the rotation of said lift drive.

15. The right angle transfer of claim 14, wherein said lift drive control comprises a flag sensor, a controller, and a flag, wherein said flag sensor is in electrical communication with said controller, and said controller is in electrical communication with said lift drive, wherein said flag is coupled to said lift drive and rotates in synchronization with said lift drive, wherein said flag sensor detects said flag once said flag has rotated to a stopping position, wherein said controller recognizes a stop signal caused by said flag sensor when said flag has rotated to said stopping position, and wherein said controller directs said lift drive to stop rotating in said lifting direction when said controller recognizes said stop signal.

16. A right angle transfer, comprising:
a base;
a plurality of conveying members that define a conveyance surface, said conveying members drivable to convey objects in a conveyance direction;
a diverting conveying member that is drivable to divert objects at an angle from said conveyance direction;
a frame that mounts said diverting conveying member for general vertical movement with respect to said conveying members and said base;
a plurality of resilient members coupled between said frame and said base and configured to bias said frame upward;
a lift drive;
a lifting assembly comprising:
a bar coupled to said lift drive and said frame;
a cam coupled to said lift drive;
wherein said lift drive is configured to rotate in a lifting direction to rotate said cam;
wherein rotation of said cam when said lift drive rotates in said lifting direction moves said bar to vertically raise said frame, thereby vertically raising said diverting conveying member above said conveying members;
wherein said lift drive is rotatable in a lowering direction that is opposite said lifting direction to thereby vertically lower said frame to vertically lower said diverting conveying member below said conveying members; and
wherein said lift drive is de-energized during rotation in said lowering direction.

17. The right angle transfer of claim 16, wherein said cam further comprises an outer cam profile, and a central rotation point about which said cam rotates, said outer cam profile comprising:
a helical section in which the radial distance between said central rotation point and said helical section changes at a constant rate along the length of said cam; and
a pair of flat sections located on opposing sides of said helical section, in which the radial distance between each said flat section and said central rotation point remains constant along the length of each flat section.

18. The right angle transfer of claim 16, wherein said right angle transfer further comprises a plurality of diverting conveying members that are drivable to divert objects at an angle from said conveyance direction, and that are vertically displaceable above and below said conveying members.

19. A right angle transfer, comprising:
a base;
a plurality of conveying members that define a conveyance surface, said conveying members drivable to convey an object in a conveyance direction;
a diverting conveying member that is drivable to divert the object at an angle from said conveyance direction;
a frame coupled to said base and said diverting conveying member;

an electrically-powered lift drive; and
a lifting assembly comprising:
- a nautilus-shaped cam mounted circumferentially around said lift drive;
- a bar coupled to a cam follower that is coupled to said cam; and
- a frame link coupled to said bar and to said frame;

wherein said lift drive is rotatable about its longitudinal axis to rotate said cam to urge said cam follower and said bar horizontally;

wherein said frame link rotates between said bar and said frame to convert the horizontal motion of said bar into vertical motion of said frame and said diverting conveying member; and wherein said diverting conveying member may be vertically raised above said conveying members to make contact with the object and divert the object at an angle from said conveyance direction.

20. The right angle transfer of claim 19, further comprising a diverting drive configured to drive said diverting conveying member, said diverting drive coupled to said frame and configured to be vertically raised and lowered with said frame.

* * * * *